May 7, 1957 P. TRAUGOTT 2,791,482
RECORD TRACE IDENTIFICATION DEVICE
Filed Dec. 24, 1953 2 Sheets-Sheet 1

INVENTOR.
Paul Traugott
BY Max L. Libman
Attorney

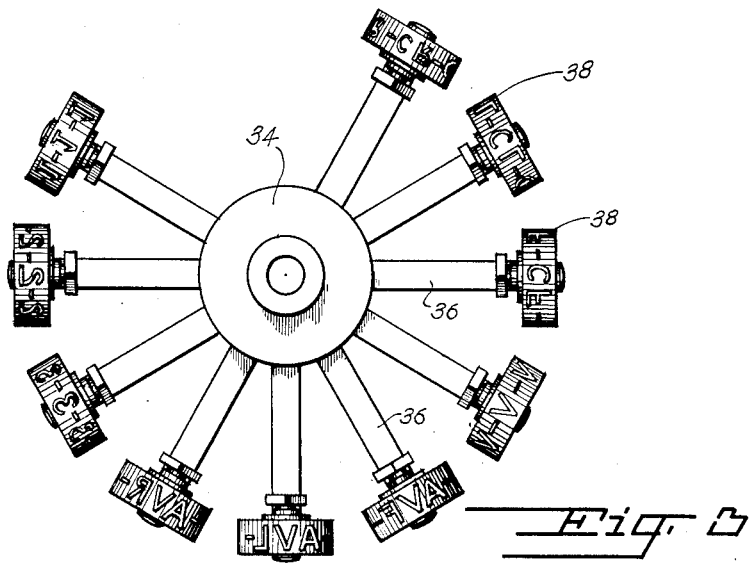
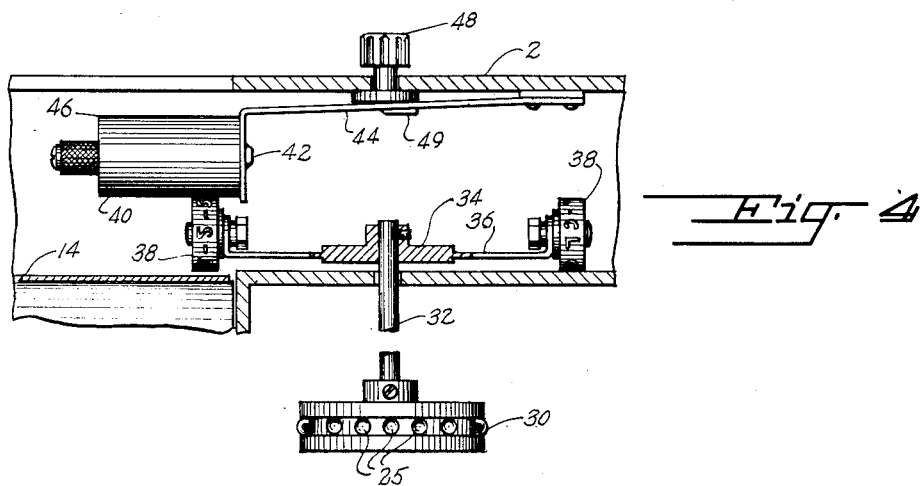

United States Patent Office 2,791,482
Patented May 7, 1957

2,791,482
RECORD TRACE IDENTIFICATION DEVICE

Paul Traugott, Greenwich, Conn., assignor to Electro-Physical Laboratories, Inc., Boston, Mass., a corporation of New York Application December 24, 1953, Serial No. 400,225

9 Claims. (Cl. 346—62)

This invention relates to a device for marking and identifying a record trace and has for its primary object the provision of such a device which is operated automatically to mark and identify the record traced on a recording medium such as a paper strip.

Recording devices are known in which a permanent record is made on a recording medium, of a number of variables in succession, the sucessive order of items recorded being either at the choice of an operator or else following either a customary or a predetermined sequence. In any case, it is highly desirable to identify the successive recordings. An example in point is provided by electrocardiograph records, commonly termed electrocardiograms, and, although the invention is not limited to the field of electrocardiography, it will be described in connection with such a device as being illustrative and exemplary of a typical form of the invention.

In taking a complete electrocardiogram a number of electrodes are connected to various points of the subject's anatomy, and records are made of the readings between various ones of these points in different combinations which have become standard for use in interpreting the heart action of the subject. It is essential to a correct interpretation of each such record that it be correctly identified with the particular electrode combination which produced it. It is customary, therefore, for the operator taking the records to mark each record as to identify the electrode combination which it represents. This marking may be done with a pencil on each section of record, or in some devices, a marking pen is provided as part of the machine, which may be operated to produce a line on the record which may be broken up into a code symbol, similar to Morse code, to identify each record as to the electrode combination which produced it. This depends on the memory of the operator, who must remember to make the record, and on his accuracy in correctly marking the record. An error or omission in either respect may, of course, completely invalidate the test, or may indicate incorrectly the state of the subject's heart.

It is a major object of the invention to provide an automatic record marker for recording devices, and specifically for electrocardiographs, which entirely eliminates the possibility of the operator's either forgetting to mark the record or marking it incorrectly.

A further object is the provision of a simple, foolproof and efficient automatic record marker for identifying the plurality of records taken sequentially, and which requires no attention on the part of the operator; which is inexpensive to construct, requires no substantial alteration to existing types of machines, and requires the minimum amount of maintenance.

The specific nature of the invention, as well as other objects and advantages thereof, will clearly appear from a description of a preferred embodiment as shown in the accompanying drawings, in which:

Fig. 3 is an enlarged plan view of the print wheel and rollers; and

Fig. 4 is an enlarged sectional view taken on line 4—4 of Fig. 1.

Figure 1:
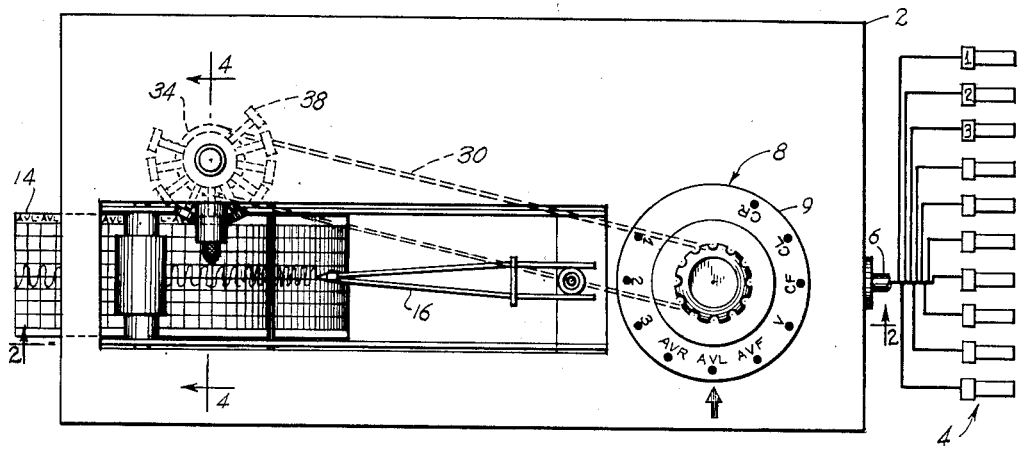
Fig. 1 is a partially schematic plan view of a recording machine embodying the invention.
Figure 2:
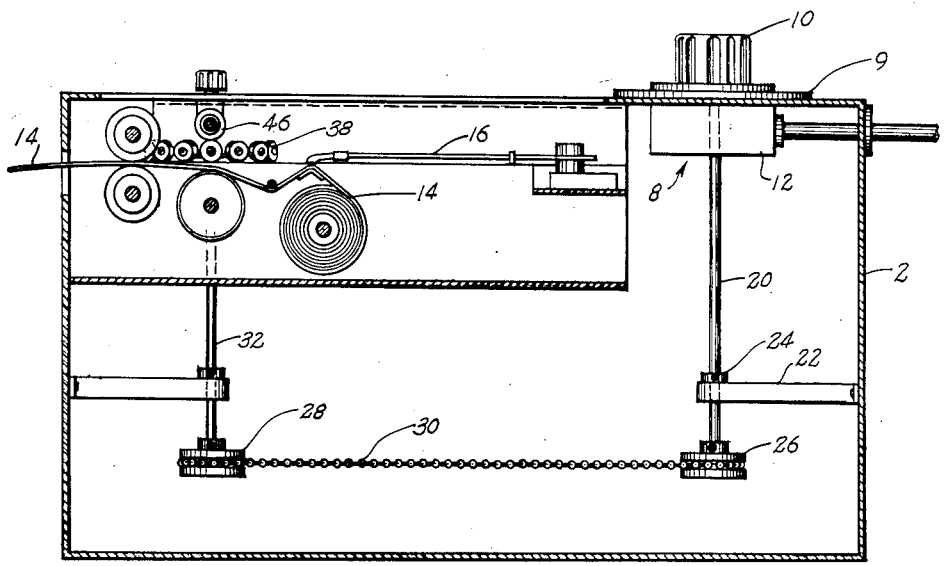
Fig. 2 is a sectional view taken on line 2—2 of Fig. 1.

Fig. 1 shows a known type of electrocardiograph machine, omitting in the interest of clarity all the standard parts and controls of such a machine which are not pertinent to the present invention. The machine is housed in a casing 2 and is provided with a plurality of electrodes schematically indicated at 4, which are attached to various portions of the subject's anatomy during a test. A lead is run from each electrode through a cable 6 into the machine. A selector switch 8 is manually rotatable to a number of positions corresponding not necessarily to the number of electrodes, but to various standard electrode combinations, as is well known in the art. Operation of switch knob 10 controls the contact positions of the electrical contacts of a multi-deck switch 12 which is of well known construction and forms per se no part of the present invention, it being necessary only to understand that each rotary position of switch knob 10 corresponds to a different standard electrode combination.

When the machine is in normal operation, a record is traced upon paper strip 14 by the movements of pen 16 which is controlled by a galvanometer which in turn records the electrical conditions between those electrodes 4 which have been selected by the particular position which switch knob 10 occupies at the time the record is being taken. As the switch is moved to various positions, conventionally in the order displayed on the switch dial 9, attached to knob 10, a different record is obviously made for each switch position. It is obviously essential to a correct interpretation of the record by the diagnostician that the record corresponding to each switch position be correctly identified. The novel mechanism which accomplishes this result will now be described.

Attached to switch knob 10 and rotatable therewith is switch shaft extension 20, which may be further supported by bracket 22 extending from the wall of the cabinet 2 and collar 24 keyed or otherwise fastened to shaft 20. Fixed to shaft 20 at the bottom end thereof is a pulley wheel 26 which drives a similar pulley wheel 28 by means of a chain drive 30. The chain is shown as the familiar swivel-type chain commonly used for electric pull-cords and similar purposes, and the pulleys are grooved and provided with a number of indentations as shown at 25 in Fig. 4, to accommodate the spaced ball portions of such a chain, but it will be understood that any other known type of non-slip pulley drive could be employed or any known type of mechanical drive whereby shaft 32 may be driven in unison with shaft 20. In the embodiment shown, shaft 32 is driven by pulley 28 and carries at its upper end spider 34. Spider 34 supports a number of radially extending flexible spring members 36 each of which is bent up at its outer end and carries a rotatable print wheel 38 thereon. The print wheels, as shown in Figs. 3 and 4, respectively bear characters corresponding to the respective positions of switch knob 10 and switch dial 9. Spider 34 is so placed with respect to the record strip 14, as best shown in Figs. 1 and 4, that one, and only one, of the print wheels 38 is positioned over one edge of the record strip 14, and the orientation is such that the one print wheel so positioned corresponds to the activated electrode circuit selected by switch knob 10. However, in the position shown in Fig. 4, it will be noted that the print wheel is out of contact with the paper, and so will make no mark upon the record strip. The selected print wheel, when in position over the record strip, is also in engagement with an inking roller 40 rotatably mounted upon a shaft 42 which is fixed at the end of a spring member 44 normally biased away from the record strip 14. A housing 46 is provided to cover the ink roller 40 and prevent accidental contact therewith by the user.

Protruding through the upper surface of casing 2 is a print button 48 which engages spring 44 as best shown in Fig. 4. It will be apparent that when print button 44 is depressed by the operator, print wheel 36 which is in printing position will be forced into printing engagement with the moving record strip 14, movement of which causes rotation of the print wheel, all the characters of which are inked by roller 40 as the wheel rotates, producing a number of repetitions of the character borne by that particular print wheel as long as button 48 is depressed and record strip 14 is moving. Usually it is only necessary for the operator to hold the push button down for a few seconds to mark a sufficient portion of the record for the purpose of identification. However, in some cases it may be desirable for the print wheel to be held down so as to mark all portions of the record strip during the test. This is made possible by the provision of a raised cam portion 49 on the lower surface of button 48, whereby if the button is rotated instead of being depressed, cam portion 49 will engage spring 44 and keep it in depressed or printing position until button 48 is rotated to its original position. With this operation, it will be apparent that the entire length of the record strip will at all points bear an indication of the record being made.

When the next electrode position is selected by switch knob 10, the print wheel corresponding to that position will obviously be moved into printing position over the record strip by the action of pulleys 26 and 28 and pulley chain 30. It is thus evident that at every position of the switch, the proper print wheel will always be in position to make the identifying record mark. It will also be apparent that there is no possibility of error since the orientation of the print wheels is entirely automatic and does not depend upon the memory or judgment of the operator. Similarly, if the button 48 is rotated into the continuous print position at the beginning of the test, there is no possibility of the operator forgetting to mark each record.

It is thus apparent that a simple, efficient and effective lead marker has been provided which accomplishes all of the stated objects.

It will be apparent that the embodiments shown are only exemplary and that various modifications can be made in construction and arrangement within the scope of my invention as defined in the appended claims.

I claim:

1. In a recording device having a recording medium which is moved past a record producing device actuated by an input signal, a plurality of sources of input signals and a manual control device selectively movable to any one of a plurality of positions for respectively selecting various predetermined ones of said sources for recording, whereby the record producing device is selectively actuated; a series of marking devices each capable of producing an identification mark corresponding respectively to one of said plurality of positions, an actuating connection between said control device and said series of marking devices for moving that marking device corresponding to the selected signal source into operative position with respect to the record medium, and means for selectively actuating the selected marking device to produce an identifying mark on said record medium.

2. In a recording device having a recording medium which is moved past a record producing device actuated by an input signal, a plurality of sources of input signals and a control device selectively movable to any one of a plurality of positions respectively corresponding to various predetermined ones of said sources, whereby the record producing device is selectively actuated; a series of marking devices each capable of producing an identification mark corresponding respectively to one of said plurality of positions, an actuating connection between said control device and said series of marking devices for moving that marking device corresponding to the selected signal source into operative position with respect to the record medium, and means for selectively actuating the selected marking device to produce an identifying mark on said record medium, each said marking device comprising a rotatable print wheel, and means for inking that print wheel which is in operative position, said inked wheel being rotated, in the actuated position, by said recording medium to produce an identification mark.

3. The invention according to claim 2, said control device being a rotary switch rotatable into a plurality of operative positions.

4. The invention according to claim 3, and a rotatable spider having a number of radially extending arms each bearing one of said print wheels, whereby rotation of said spider positions a selected wheel in operative position.

5. The invention according to claim 4, said actuating connection being a mechanical drive.

6. The invention according to claim 5, said mechanical connection being a coupled pulley arrangement for rotating said spider in accordance with the rotation of said rotary switch.

7. The invention according to claim 6, said radially extending arms being flexible toward said record material and said means to move the wheel into engagement with the record material by actuating the selected print wheel comprising means for flexing the arm of the selected print wheel toward the recording material whereby movement of the record material rotates the print wheel to imprint an identifying mark on the record material.

8. The invention according to claim 7, and a locking device for said flexing means to maintain the selected print wheel in contact with the record material.

9. The invention according to claim 8, said means for inking comprising an inking roller normally flexibly mounted out of contact with the selected print wheel and selectively movable into contact with said print wheel to press a wheel into engagement with the record material.

References Cited in the file of this patent

UNITED STATES PATENTS

| | | |
|---|---|---|
| 963,908 | Lee | July 12, 1910 |
| 1,078,011 | Tomlinson | Nov. 11, 1913 |
| 1,091,718 | Tomlinson | Mar. 31, 1914 |
| 1,124,820 | Simonson | Jan. 12, 1915 |
| 1,773,246 | Turner | Aug. 19, 1930 |
| 2,381,188 | Swindle | Aug. 7, 1945 |
| 2,757,062 | Hood | July 31, 1956 |